2,882,167
CAKE SHORTENING CONTAINING ACETYLATED MONOGLYCERIDES AND METHOD OF MAKING SAME

August F. Gehrke, Ralph A. Marmor, William F. Henry, and Sheldon I. Greenberg, Minneapolis, Minn., assignors to The Pillsbury Company, a corporation of Delaware No Drawing. Application February 27, 1957
Serial No. 642,659

3 Claims. (Cl. 99—118)

This invention relates to shortenings, and more particularly to an improved shortening for cake and the like.

Cake shortenings are commonly produced from triglycerides to which various amounts and kinds of emulsifying agents may be added. The triglycerides may be partially or fully hydrogenated, rearranged and/or interesterified. These triglycerides may then be used as they are or they may be blended in various proportions. The prior art is replete with information on procuring and preparing composite shortenings of various melting points and having various degrees of plasticity. Emulsifiers such as lecithin, monoglycerides, mixtures of mono- and diglycerides and other surface active agents have been added to triglycerides to improve the emulsifying properties and to change the plasticity of the shortening. It is generally accepted that monoglycerides are more potent as emulsifiers than diglycerides.

It is also well known that basestock of shortening can be appropriately modified modified with respect to its plasticity by substituting acetyl groups for fatty acid groups in the molecular structure thereof. Thus, Patent Number 2,614,937 discloses a number of examples wherein hydrogenated oils were treated with triacetin and the resulting products rearranged to bring about the desired plasticity and melting point.

The instant invention is concerned with improving the emulsification properties of the shortening for specific purposes while preserving proper plasticity. It is, therefore, a general object of the invention to provide a shortening which will produce a superior cake having an improved texture, grain, flavor, volume, and eating quality.

More specifically, it is an object of the invention to provide a shortening which has been admixed with incompletely acetylated monoglycerides to achieve combinative improvements in its plasticity and emulsifying properties.

In attempting to determine the effect of various acetylated produces on the shortening characteristics of fatty acid triglycerides, it was noted that certain experimentation resulted in somewhat improved cakes when the shortenings therefrom were incorporated into such cake and then baked. Further experimental work was, therefore, indicated to establish whether acetylated products are beneficial in cake formulae and, if so, how the acetylation should be conducted, to what extent it should be carried out, and at what concentration the product should be blended into a triglyceride shortening base for best results.

Three general procedural routes were followed to determine how the acetylation should be carried out:

1. INTERESTERIFICATION OF FATTY ACID TRIGLYCERIDES WITH TRIACETIN

Basestocks variously of animal and vegetable fats, essentially triglycerides, were blended with triacetin in different proportions and reacted, using a conventional catalyst, sodium methylate, for rearrangment. A mixture of the following triglycerides resulted:

(a) Triacetin (triglyceride with three acetyl groups);
(b) Triglycerides with two acetyl groups;
(c) Triglycerides with one acetyl group;
(d) Triglycerides without acetyl groups.

The composition of the mixture obtained varies with the proportions of triglyceride basestock and triacetin mixed at the start and is the random or probability distribution for that particular starting mixture.

It was found that the fat and triacetin must be thorougly dry at the start to prevent destruction of the catalyst and the catalyst itself must be freshly prepared or kept in bottles sealed shut with wax after each portion is withdrawn. Otherwise, an incomplete reaction may be obtained due to previous destruction by atmospheric moisture of much of the catalyst.

The above experiment was carried out using $\frac{1}{16}$ mol. of triacetin to 1 mol. of basestock. Rearranged lard, tallow, hydrogenated soybean oil and a blend of hydrogenated soybean and cottonseed oil were all tried as basestock. The experiments were repeated, using first $\frac{1}{8}$ mol. of triacetin and then 1. mol. to 1 mol. of basestock.

In each case, the volatiles (mostly unreacted triacetin) were stripped off in a steam deodorizer and the resulting fat plasticized and incorporated into standard white cake mix of the following formulation:

White cake formula

| Ingredient: | Percent |
|---|---|
| Flour | 42.788 |
| Sugar, granulated | 44.170 |
| Egg albumen | 1.500 |
| Salt | 0.650 |
| Sodium bicarbonate | 0.680 |
| Sodium acid pyrophosphate | 0.660 |
| Anhydrous monocalcium phosphate | 0.340 |
| Vanilla | 0.012 |
| Shortening | 9.200 |
| | 100.000 |

The resultant cakes were not promising. All were inferior to a control cake made with the same formula above and using a standard commercial shortening.

A further attempt to match the performance of the control cake was made by blending the above interesterified products with their respective parent basestocks to a saponification value of 200.6, which was the saponification value of the control. Bake tests on these shortenings, however, were unsatisfactory and this route was consequently abandoned.

2. INTERESTERIFICATION OF MONOGLYCERIDES WITH TRIACETIN

A commercial peanut monoglyceride stock (about 40% alpha-monoglycerides) was blended with triacetin in various proportions and reacted using sodium methylate as catalyst. A more complex mixture of the following ten glycerides resulted:

a. Triglycerides—
 i. Triglycerides with no acetyl groups;
 ii. Triglycerides with one acetyl group;
 iii. Triglycerides with two acetyl groups;
 iv. Triglycerides with three acetyl groups (triacetin).
b. Diglycerides—
 i. Diglycerides with no acetyl groups;
 ii. Diglycerides with one acetyl group;
 iii. Diglycerides with two acetyl groups (di-acetin).
c. Monoglycerides—
 i. Monoglycerides without acetyl group;
 ii. Monoglycerides with one acetyl group (mono-acetin).
d. Glycerine.

Again, the composition of the resultant mixture varied with the proportions of monoglyceride stock and triacetin used at the start, a random distribution of the above ten possible components being obtained in each case. Two products were made, starting with (1) 0.7 mol. peanut monoglycerides and 0.3 mol. of triacetin, and (2) 0.5 mol. monoglycerides and 0.5 mol. triacetin.

Each of the above (1) and (2) was blended in five different proportions with rearranged lard, and also in the same proportions with a mixture of hydrogenated cottonseed and soya oils known in the trade as "Vream" to produce the following twenty shortenings:

(1) Rearranged lard (75%)+product (1) above (25%)
(2) Rearranged lard (80%)+product (1) above (20%)
(3) Rearranged lard (85%)+product (1) above (15%)
(4) Rearranged lard (90%)+product (1) above (10%)
(5) Rearranged lard (95%)+product (1) above (5%)
(6) Rearranged lard (75%)+product (2) above (25%)
(7) Rearranged lard (80%)+product (2) above (20%)
(8) Rearranged lard (85%)+product (2) above (15%)
(9) Rearranged lard (90%)+product (2) above (10%)
(10) Rearranged lard (95%)+product (2) above (5%)
(11) Vream (regular) (75%)+product (1) above (25%)
(12) Vream (regular) (80%)+product (1) above (20%)
(13) Vream (regular) (85%)+product (1) above (15%)
(14) Vream (regular) (90%)+product (1) above (10%)
(15) Vream (regular) (95%)+product (1) above (5%)
(16) Vream (regular) (75%)+product (2) above (25%)
(17) Vream (regular) (80%)+product (2) above (20%)
(18) Vream (regular) (85%)+product (2) above (15%)
(19) Vream (regular) (90%)+product (2) above (10%)
(20) Vream (regular) (95%)+product (2) above (5%)

All twenty shortenings were plasticized and incorporated into cake mixes. The performance of the 0.7 mol. product and the 0.5 mol. product were nearly the same, and the best cakes were obtained when 20% of the product was incorporated into 80% of the Vream basestock. Although none of the cakes was quite equal to the control cake in volume, grain and texture, the performance was better than when shortenings prepared by interesterifying triglycerides with triacetin were used.

Independent bake tests using triacetin in the shortening components were found to give unsatisfactory results, and no emulsification action was observed in baked cakes, using the above standard formula. It was also found that, from the standpoint of baking performance, cakes made from shortening into which was incorporated monoglycerides with one acetyl group and diglycerides with two acetyl groups showed no improvement over those made with the plain basestock in the absence of an emulsifier. In the light of the foregoing independent bake tests and of the unsatisfactory bake tests made with shortening blended with triglycerides having one or two acetyl groups, it is an important generalization of this invention that glyceride additive to conventional basestock shortenings enhance the baking properties of cakes when the glyceride is a diglyceride of the type which contains one acetyl group, one long-chained fatty acid group and one hydroxyl group, such diglyceride being hereafter arbitrarily called "G-3." This is opposite to the generally accepted viewpoint that diglycerides are less potent as emulsifiers than monoglycerides.

Since peanut oil, which was interesterified with triacetin in the foregoing procedure Number 2, originally contains only about 40% alpha-monoglycerides, a more concentrated source was sought for purposes of better determining the effective ranges of different proportions of our diglyceride emulsifier component in basestock shortenings. Molecularly distilled monostearin having over 90% alpha-monoglycerides and known commercially as Myverol 18-06 a product of Distillation Products, Inc.) was obtained for this purpose.

The above monostearin (Myverol 18-06) was then interesterified with triacetin at the rate of 0.6 mol. monostearin and 0.4 mol. of triacetin. The volatiles were stripped off and bake tests performed on shortening made from 25%, 20%, 15%, 10% and 5% of the product, respectively, in (a) rearranged lard and (b) Vream (the same as that used above). The baking results on the cakes containing the product at the 20% and 15% level were best, the 15% level appearing to give the better results of two. These levels in Vream were particularly excellent and appeared to be equal or superior to the control cake in volume, texture, grain and all other respects.

3. ACETYLATION OF MONOGLYCERIDES WITH ACETIC ANHYDRIDE

The commercial peanut monoglyceride stock used above was acetylated to intermediate levels of (1) 25% and (2) 35% with acetic anhydride, since preliminary work had already indicated favorable results on a product acetylated to the 12.4% level and less favorable results on the 48.4% level acetylated product. A mixture of the following glycerides were obtained:

a. Triglycerides—
 i. Triglycerides with no acetyl groups,
 ii. Triglycerides with one acetyl group,
 iii. Triglycerides with two acetyl groups.
b. Diglycerides—
 i. Diglycerides with no acetyl groups;
 ii. Diglycerides with one acetyl group.
c. Monoglycerides—
 i. Monoglycerides with no acetyl groups.

The above products (1) and (2) were made by adjusting the ratio of acetic anhydride to peanut monoglycerides so that 25% and 35% acetylation occurred, respectively. After stripping off volatiles, the products were plasticized into various basestocks at the levels of 25%, 20%, 15%, 10% and 5%.

Bake tests were made on the above ten shortenings. The 35% acetylated product yielded fair cakes with the best at the 20% level. The 20% and 25% acetylated product gave two cakes as good as, or better than, the control cake. The 15% level gave a very good cake, but not quite as good as the first two.

To prepare a product with the maximum concentration of our diglyceride component, G-3, monostearin (molecularly distilled) was acetylated with acetic anhydride. The following constituents were present after acetylation:

a. Monoglycerides
b. Diglycerides with one acetyl group (G-3)
c. Triglycerides with two acetyl groups Acetylations were carried out using enough acetic anhydride to effect slightly less than 50% acetylation in an attempt to (a) maximize the formation of a diglyceride with one acetyl group and (b) minimize the formation of a triglyceride with two acetyl groups. The net result was the production of more of the desired diglyceride, G-3, and less di-acetyl monostearin.

A series of acetylations were first carried out varying the time from two and one-half hours to five hours, and then to seven and one-half hours, all at atmospheric pressure, allowing the reaction mixture to reflux at 140 degrees centigrade. A second series of acetylations was carried out under pressure, allowing the pressure to increase to ten pounds above atmospheric pressure, and holding it there by maintaining the required temperature.

Results of bake tests on the above acetylated products and on interesterified products made from monostearin and also from commercial peanut monoglycerides, by rearranging with triacetin are given in the following tables at the different levels of emulsifier indicated. Although the cake volume is of great importance in the overall quality of the cake, other factors, such as grain, texture, fragility, ease of pan removal and eating quality are of significance. Despite the subjective nature of the latter qualities, it is necessary to represent them numerically to arrive at a number which represents the composite cake quality. Hence, in the column headed "Cake quality," the figures given represent the sequence from best to poorest and were obtained by a careful inspection of the cake in question.

Other factors, such as specific gravity of the batter, are of use as a guide, but are not infallible. Although all good cakes resulted from batters of low gravity, not all the batters of low gravity produced good cakes.

Various triglyceride bases were used with the prepared emulsifiers and in the percentages of base indicated in the following tables, parallel results being evident for all the base employed. The specific tables presented herein relate to a basestock shortening made from a mixture of hydrogenated cottonseed and soya oils but are characteristic of the behavior of all such basestocks as rearranged lard, peanut oil and marine oils when intermixed with the specific emulsions and in the proportions noted.

TABLE I.—CAKES MADE FROM SHORTENING CONTAINING 5% EMULSIFIER PLUS 95% BASESTOCK (1.) ACETYLATED MONOSTEARIN AND ACETYLATED COMMERCIAL MONOGLYCERIDES

| Percent G-3 in total emulsifier | Description of Product | Cake Vol. | Description of Cake | Cake Quality Rating |
|---|---|---|---|---|
| 77.7 | Acetylated 90% Glycerol Monostearate 2½ hrs. @ 10#-S. | 1,080 | Average grain and texture. | (1) |
| 58.3 | Acetylated 90% Glycerol Monostearate 7½ hrs. @ 1 atm. | 1,041 | Compact, thick cell walls. | (2) |
| 57.3 | Acetylated 90% Glycerol Monostearate 2½ hrs. @ 1 atm. | 1,005 | Compact grain and thick cell walls. | (3) |
| 32.8 | Acetylated Peanut Oil Monoglycerides 37.7% Acetylation. | 995 | Worst of series | (5) |
| 21.6 | Acetylated Peanut Oil Monoglycerides 23.7% Acetylation. | 1,059 | Compact, flat cake; worst. | (4) |
| 0.0 | Completely Acetylated Product (Aldocet). | 951 | Compact, flat poor cake. | (7) |
| 44.5 | Acetylated Monoglyceride (Myvacet). | 970 | Worst in series | (6) |

(2) INTERESTERIFIED PRODUCTS

| | | | | |
|---|---|---|---|---|
| 34.5 | Mole Ratio: (0.6 m.) Myverol, (0.4 m.) Triacetin. | 1,090 | Fine grain but slightly heavy cell walls. | (1) |
| 24.7 | Mole Ratio: (0.7 m.) Peanut Oil Monoglyceride, (0.3 m.) Triacetin. | 995 | Slight compact thick cell walls; very poor cake. | (2) |
| 27.6 | Mole Ratio: (0.5 m.) Peanut Oil Monoglyceride, (0.5 m.) Triacetin. | 967 | Compact, poor cake. | (3) |

TABLE II.—CAKES MADE FROM SHORTENING CONTAINING 10% EMULSIFIER PLUS 90% BASESTOCK (1) ACETYLATED MONOSTEARIN AND ACETYLATED COMMERCIAL MONOGLYCERIDES

| Percent G-3 in total emulsifier | Description of Product | Cake Vol. | Description of Cake | Cake Quality Rating |
|---|---|---|---|---|
| 76.7 | Acetylated 90% Glycerol Monostearate 2 hrs. @ 10#-S. | 1,125 | Fine, even grain, thin cell walls, good shape; best cake. | (2) |
| 0.0 | Completely Acetylated Product (Aldocet). | 974 | Bready texture and grain, very poor. | (9) |
| 77.7 | Acetylated 90% Glycerol Monostearate 2½ hrs. @ 10#-S. | 1,160 | Fine, even grain and texture, thin cell walls; best cakes @ 10 and 15%. | (1) |
| 58.3 | Acetylated 90% Glycerol Monostearate 7½ hrs. @ 1 atm. | 1,133 | Fine, even grain and texture, thin cell walls; best cakes @ 10% and 15%. | (3) |
| 44.5 | Acetylated Monoglyceride (Myvacet). | 1,038 | Not as good as @ 15% level; grain more compact. | (7) |
| 57.3 | Acetylated 90% Glycerol Monostearate 2½ hrs. @ 1 atm. | 1,232 | Fragile cake but good texture and grain. | (4) |
| 32.8 | Acetylated Peanut oil Monoglycerides 37.7% Acetylation. | 1,056 | Cake only fair, grain and texture all right but not superior. | (6) |
| 21.6 | Acetylated Peanut Oil Monoglycerides 23.7% Acetylation. | 1,059 | Cake not good; more open-grained. | (8) |
| 28.6 | Acetylated Menhaden Oil Monoglycerides. | 1,072 | Cake finer grained than Peanut Oil Monoglyceride cake. | (5) |

(2) INTERESTERIFIED PRODUCTS

| | | | | |
|---|---|---|---|---|
| 34.5 | Mole Ratio: (0.6 m.) Myverol, (0.4 m.) Triacetin. | 1,152 | Fair grain and texture, slightly heavy cell walls, next to worst. | (1) |
| 24.7 | Mole Ratio: (0.7 m.) Peanut Oil Monoglycerides, (0.3 m.) Triacetin. | 965 | Only fair cake, slightly heavy cell walls. | (3) |
| 27.6 | Mole Ratio: (0.5 m.) Peanut Oil Monoglycerides, (0.5 m.) Triacetin. | 1,090 | Not good texture and grain, definitely inferior. | (2) |

TABLE III.—CAKES MADE FROM SHORTENING CONTAINING 15% EMULSFIER PLUS 85% BASESTOCK

(1) ACETYLATED MONOSTEARIN AND ACETYLATED COMMERCIAL MONOGLYCERIDES

| Percent G-3 in total emulsifier | Description of Product | Cake Vol. | Description of Cake | Cake Quality Rating |
|---|---|---|---|---|
| 76.7 | Acetylated 90% Glycerol Monostearate 2 hrs. @ 10#-S. | 1,140 | Almost as good as 10% level cake which was rated +100. | (2) |
| 77.7 | Acetylated 90% Glycerol Monostearate 2½ hrs. @ 10#-S. | 1,180 | Fine, even-grained cake, almost as fine as @ 10%. | (1) |
| 58.3 | Acetylated 90% Glycerol Monostearate 7½ hrs. @ 1 atm. | 1,133 | Not quite, but almost as good as at 10%. | (5) |
| 57.3 | Acetylated 90% Glycerol Monostearate 2½ hrs. @ 1 atm. | 1,264 | Best of series but much too fragile. | (3) |
| 27.6 | Acetylated Peanut Oil Monoglycerides 21.5% Acetylation. | 1,102 | Cake fair in grain and Texture but not superior. | (8) |
| 21.6 | Acetylated Peanut Oil Monoglycerides 23.7% Acetylation. | 1,184 | Not as good as 20%, 25% level cakes. | (7) |
| 0.0 | Completely Acetylated Product (Aldocet). | 989 | Bready grain and texture. | (9) |
| 28.6 | Acetylated Menhaden Oil Monoglyceride 22.6% Acetylation. | 1,102 | Better than Peanut Oil Monoglyceride cake of same level. | (6) |
| 44.5 | Acetylated Monoglyceride (Myvacet). | 1,129 | Best of Myvacet series—good grain and texture. | (4) |

(2) INTERESTERIFIED PRODUCTS

| | | | | |
|---|---|---|---|---|
| 34.5 | Mole Ratio: (0.6 m.) Myverol, (0.4 m.) Triacetin. | 1,256 | Texture and grain good. | (1) |
| 24.7 | Mole Ratio: (0.7 m.) Peanut Oil Monoglyceride, (0.3 m.) Triacetin. | 1,033 | Not particularly good—sharply below the 20% cake. | (3) |
| 27.6 | Mole Ratio: (0.5 m.) Peanut Oil Monoglyceride, (0.5 m.) Triacetin. | 1,044 | Texture and Grain fair—not outstanding. | (2) |

TABLE IV.—CAKES MADE FROM SHORTENING COMPRISING 20% EMULSIFIER PLUS 80% BASESTOCK

(1) ACETYLATED MONOSTEARIN AND ACETYLATED COMMERCIAL MONOGLYCERIDES

| Percent G-3 in total emulsifier | Description of Product | Cake Vol. | Description of Cake | Cake Quality Rating |
|---|---|---|---|---|
| 58.3 | Acetylated 90% Glycerol Monostearate 7½ hrs. @ 1 atm. | 1,140 | Good cake but optimum was at 10%-15% level. | (6) |
| 57.3 | Acetylated 90% Glycerol Monostearate 2½ hrs. @ 1 atm. | 1,145 | Average grain and texture but fragile. | (7) |
| 27.6 | Acetylated Peanut Oil Monoglycerides 21.5% Acetylation. | 1,110 | Grain and texture not quite equal to control cake but close. | (3) |
| 32.8 | Acetylated Peanut Oil Monoglycerides 37.7% Acetylation. | 1,132 | Best of series but not as good as above cake. | (4) |
| 21.6 | Acetylated Peanut Oil Monoglycerides 23.7% Acetylation. | 1,240 | Good cake—2nd best of series. | (2) |
| 28.6 | Acetylated Menhaden Oil Monoglycerides 22.6% Acetylation. | 1,178 | Best of Acetylated series; better than Acetylated Peanut Oil Monoglyceride @ 20%+75. | (1) |
| 0.0 | Completely Acetylated Product (Aldocet). | 966 | Bready, coarse grain and texture. | (8) |
| 44.5 | Acetylated Monoglyceride (Myvacet). | 1,122 | 2nd Best cake of Myvacet series (15% level best). | (5) |

(2) INTERESTERIFIED PRODUCTS

| | | | | |
|---|---|---|---|---|
| 34.5 | Mole Ratio: (0.6 m.) Myverol, (0.4 m.) Triacetin. | 1,184 | Fairly good texture and grain. 2nd best in series. | (1) |
| 24.7 | Mole Ratio: (0.7 m.) Peanut Oil Monoglycerides, (0.3 m.) Triacetin. | 1,102 | Best of series—good texture and grain. | (3) |
| 27.6 | Mole Ratio: (0.5 m.) Peanut Oil Monoglycerides, (0.5 m.) Triacetin. | 1,083 | Good texture and grain. | (2) |

TABLE V.—CAKES MADE FROM SHORTENING CONTAINING 25% EMULSIFIER PLUS 75% BASESTOCK

(1) ACETYLATED MONOSTEARIN AND ACETYLATED COMMERCIAL MONOGLYCERIDES

| Percent G-3 in total emulsifier | Description of Product | Cake Vol. | Description of Cake | Cake Quality Rating |
|---|---|---|---|---|
| 58.3 | Acetylated 90% Glycerol Monostearate 7½ hrs. @ 1 atm. | 1,140 | Fairly good but not quite as good as 20% level. | (7) |
| 57.3 | Acetylated 90% Glycerol Monostearate 2½ hrs. @ 1 atm. | 1,160 | Average in texture and grain but very fragile cake. | (8) |
| 27.6 | Acetylated Peanut Oil Monoglyceride 21.5% Acetylation. | 1,133 | Not quite equal to control cake on grain and texture, but close. | (3) |
| 32.8 | Acetylated Peanut Oil Monoglycerides 37.7% Acetylation. | 1,079 | 2nd best cake of series; good texture and grain. | (5) |
| 21.6 | Acetylated Peanut Oil Monoglycerides 23.7% Acetylation. | 1,256 | Good cake—average grain and texture. | (1) |
| 38.8 | Acetylated Peanut Oil Monoglycerides 48.4% Acetylation. | 1,150 | Good cake—not quite up to control cake. | (4) |
| 28.6 | Acetylated Menhaden Oil Monoglyceride 22.6% Acetylation. | 1,185 | 2nd best of Acetylation series; better than Peanut Oil @ 25%. | (2) |
| 44.5 | Acetylated Monoglyceride (Myvacet). | 1,099 | 25% not as good as 20%, 15%, but almost as good. | (6) |

(2) INTERESTERIFIED PRODUCTS

| | | | | |
|---|---|---|---|---|
| 34.5 | Mole Ratio: (0.6 m.) Myverol, (0.4 m.) Triacetin. | 1,224 | Not so good texture and grain—3rd best in series. | (1) |
| 24.7 | Mole Ratio: (0.7 m.) Peanut Oil Monoglycerides, (0.3 m.) Triacetin. | 1,094 | 2nd best in series; average texture and grain. | (3) |
| 27.6 | Mole Ratio: (0.5 m.) Peanut Oil Monoglycerides, (0.5 m.) Triacetin. | 1,160 | Fair texture and grain—not outstanding. | (2) |

By way of comparison, an average production control cake utilizing the foregoing white cake formula outlined above with an ordinary commercial shortening and a conventional emulsifier rated 1110 when judged by the same standards as the cakes outlined in the tables.

Referring to Table I above, when the base stock shortening constituted 95% of the total shortening and the specific emulsifiers constituted but 5% of the total shortening, none of the cakes baked therefrom were on a par with the production control cake, although it appeared significant that, as the percentage of G-3 in the emulsifier increased, the cake quality rose in value and appeared best at the 77% level of G-3 in the emulsifier component.

Referring to Table II, where the total shortening consisted of 90% base stock shortening and 10% of the emulsifier component, the cakes baked at the lower G-3 concentrations in the emulsifier were still not good, but quality increased rapidly as the percentage of G-3 increased. Cakes better than the production control cake were obtained when the emulsifier component at the 10% level contained between 58% and 77% of G-3.

Referring to Table III, when the total shortening contained 85% basestock and 15% of the various specific emulsifiers, improvement was noted even at the low G-3 percentages in the emulsifier and the cakes were generally equal or better than the production control cake rated at 1110. As in the case of the cakes rated in Table II, the higher concentration of G-3 in the emulsifier produced very good cakes and the quality consistently increased with an increase in the G-3 content.

Referring to Table IV, the total shortening consisted of 80% basestock shortening and 20% of the specific emulsifier. Very good cakes were produced even at lower G-3 concentration in the emulsifier, but at 58% G-3 in the emulsifier component the cake quality again dropped off and approached production control quality. It, therefore, appeared that an optimum condition existed which was related to the G-3 concentration in the emulsifier and that higher concentrations would result in a reversal in cake quality.

As a check on the behavior of cakes at the optimum concentration of G-3 in the emulsifier, a still higher level of specific emulsifier was employed as set forth in Table V where 75% basestock shortening was employed in combination with 25% of the specific emulsifier. Here, again, it was evident that excellent cakes were produced at the lower levels of G-3 content in the emulsifier and that, as the G-3 content increased, an optimum was again reached beyond which cake quality gradually diminished.

The data from the above tables indicates that, as the G-3 content of the shortening component of the cake mix increases, the cake quality rises until an optimum is reached, after which the cake quality decreases somewhat with further increase of G-3 content. It is evident that the optimum amount of G-3 in the total mix can be attained by using a greater percentage of the emulsifier component in the shortening having a lower G-3 content, or by using a lesser quantity of emulsifier in the shortening, but having a higher G-3 content. It appears consistent throughout all of the experimental work above noted that G-3 content is largely responsible for the behavior of the cake quality. Minor variations in cake quality ratings with respect to G-3 content are within the range of error of baking procedure and product analysis. Beyond the optimum G-3 content over-emulsification accounts for the decline in cake quality. It is, of course, known that deleterious effects can be obtained in any cake mix where the product is over-emulsified. Thus, reason would dictate that in producing an optimum cake, one would not deliberately add an excess of G-3 or any other conventional emulsifiers which may tend towards over-emulsifying the mix.

Relating the foregoing data to the G-3 content, it becomes apparent that a range of from 3% to 15% of G-3 in the total shortening will give consistent improvement to conventional basestock shortenings when used in a conventional cake mix. The G-3 product is a diglyceride which contains one acetyl group, one long-chained fatty acid group, and one hydroxyl group, hence is pin-pointed as an extraordinary cake improver when incorporated as an emulsifier in conventional basestock shortening. The percentage of the G-3 component does not materially alter or interfere with the selected consistency of the basestock shortening and, hence, permits a wide range of combinative formulation requiring but little experimentation to achieve the improved results noted.

What we claim is:

1. A shortening product comprising from 85% to 97% of an edible triglyceride oil and 3% to 15% of a diglyceride having one long-chain fatty acid group, one acetyl group and one hydroxyl group.

2. The method of producing a cake shortening; said method consisting in reacting an edible glyceride oil, said glyceride oil comprising mixtures of triglycerides and monoglycerides, with triacetin in the presence of an esterification catalyst to produce a reaction product having between 3% and 15% of a diglyceride having one long-chain fatty acid group, one acetyl group and one hydroxyl group.

3. The method of producing a cake shortening; said method consisting in reacting an edible glyceride oil, said glyceride oil comprising mixtures of triglycerides and monoglycerides, with acetic anhydride to produce a reaction product having between 3% and 15% of a diglyceride having one long-chain fatty acid group, one acetyl group and one hydroxyl group.

References Cited in the file of this patent

UNITED STATES PATENTS

| | | |
|---|---|---|
| 2,132,701 | Richardson et al. | Oct. 11, 1938 |
| 2,745,749 | Feuge et al. | May 15, 1956 |
| 2,764,605 | Embree et al. | Sept. 25, 1956 |

OTHER REFERENCES

Feuge: "Acetoglycerides—New Fat Products of Potential Value to the Food Industry," Food Technology, June 1955, pp. 314–318.